Patented June 10, 1952

2,600,054

UNITED STATES PATENT OFFICE 2,600,054

PROCESS FOR PREPARING ESTERS

Johannes Thomas Hackmann, Amsterdam, Netherlands, assignor to Shell Development Company, San Francisco, Calif., a corporation of Delaware No Drawing. Application July 26, 1947, Serial No. 764,027. In the Netherlands November 17, 1943

Section 1, Public Law 690, August 8, 1946
Patent expires November 17, 1963

10 Claims. (Cl. 204—158)

This invention relates to a process for preparing esters, and more particularly, esters of the glycol type.

The term "glycol ester," as employed herein, includes those compounds having a pair of adjacent carbon atoms of aliphatic character which are linked either one to an acyl radical and the other to a hydroxyl radical, or both to acyl radicals, and the term also includes those compounds having other acyl groups than those linked to said adjacent carbon atoms.

It has been discovered that glycol esters may be prepared by reacting an aldehyde, an unsaturated organic compound, and oxygen. The aldehyde reactant employed is of either the saturated aliphatic or the aromatic type, and the unsaturated compound is one whose unsaturation is olefinic in character. That is to say, the unsaturated compounds useful in the present invention are those having a double bond between one or more pairs of adjacent, aliphatic carbon atoms.

When an unsaturated compound containing but the one olefinic double bond and an aldehyde are employed in approximately equimolar proportions, a glycol monoester is formed, a representative reaction being,

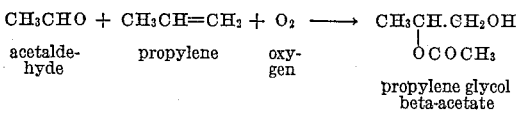

propylene glycol
beta-acetate

On the other hand, with larger proportions of the aldehyde component an acyl radical becomes linked to each of the olefinic carbon atoms, e. g.,

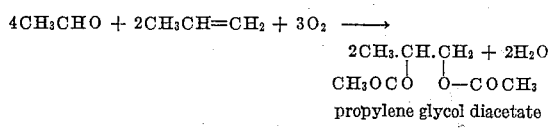

propylene glycol diacetate

The unsaturated organic compounds which are suitable for employment as reactants in the present invention are those containing an olefinic linkage, i. e., containing one or more double bonds between adjacent carbon atoms of aliphatic character, and they may be hydrocarbons, substituted hydrocarbons (i. e., compounds wherein one or more of the hydrogen atoms of the hydrocarbon has been replaced by an inorganic group, as sulfate, nitrate, or halogen, for example), alcohols, ketones, ethers, carboxylic acids or esters. Representative compounds of these various types, any one of which may be used as a reactant with an aldehyde and oxygen, are ethylene, propylene, allene, 1-pentene, 1-cetene, 2-methyl-2-pentene, 1,3-butadiene, 2-methyl-1,3-butadiene, 1,4-pentadiene, 1-chloropropen-2, 1-chloro-2-methyl-2-propene, 1-bromobutadiene-2,4, propen-2-ol-1, buten-1-ol-3, penten-1-ol-5, pentadiene-1,4-one-3, 2-methyl-penten-2-one-4, divinyl ether, methyl allyl ether, acrylic acid, crotonic acid, methacrylic acid, heptadecene-8-carboxylic acid-1, vinyl acetate, allyl acetate, methallyl acetate, methallyl butyrate and allyl propionate.

The aldehyde reactant in the process described herein is of either the saturated aliphatic or the aromatic type. Representative aliphatic aldehydes which may be used are ethanal, propanal, dodecanal, and trimethylacetaldehyde, as well as substituted aldehydes, as monochloroethanal, 3-chloropentanal, and 4-bromobutanal, for example. Representative aromatic aldehydes which may be used as reactants are benzaldehyde, phenyl acetaldehyde, and the phenylpropionaldehydes.

The third reactant employed in the process of the present invention is oxygen, and it may be supplied from any convenient source. The preferred practice is to provide the oxygen in the form of a gas which is either pure oxygen or a mixture of oxygen with other gases, as air.

The esterification reaction described herein will proceed to a limited degree even in the absence of a catalyst or other reaction initiator. However, it is preferred that at least one reaction initiator of the group consisting of chemically active light rays and oxidation catalysts be employed. For example, the process is greatly accelerated when the reactants are exposed to chemically active rays of light emitted from a quartz or a mercury lamp. Benefit may also be derived from employment of a minor percentage of one or more organic photochemical sensitizers, as eosine, chlorophyll, hemin and hematoporphyrine. Any of the large number of inorganic materials known to have a catalyzing effect on oxidation processes may also be used, as for example cobalt acetate, ferric oxide, vanadium oxide or platinum oxide.

The temperature at which the esterification reaction of this invention takes place should be maintained within the range —80° C. to 60° C. For best results, it is preferred that the reactants be maintained at a temperature between —20° C. and 10° C. The pressure under which the system is maintained is not critical, and either atmospheric, subatmospheric, or superatmospheric pressures may be used. When the reactants (other than oxygen) are relatively non-volatile liquids at the temperatures employed, the usual practice is to carry on the reaction at atmospheric pressure, though with more volatile reactants it is preferred to utilize superatmospheric pressures.

It is preferred that the process of this invention be carried on by bubbling the oxygen or oxygen-containing gas through a homogeneous liquid system containing both the aldehydic and the unsaturated organic reactants, together with a catalyst. Water is preferably excluded when making up the system. In some cases it is necessary to employ a solvent in which the reactants are either soluble or miscible in order to obtain a homogeneous system of this character, and even when the aldehydic and unsaturated reactants may be mixed to form a homogeneous liquid, it is often of advantage to use a solvent in order to obtain a somewhat less concentrated solution. Of the many organic liquids which are satisfactory for this purpose, it is preferred to use saturated esters such as methyl acetate, ethyl acetate, or ethyl butyrate.

The various glycol monoesters and glycol diesters obtained by a practice of the present invention may be converted into glycols by saponification in the usual manner. Further, by starting with an unsaturated ester it is possible to prepare other compounds containing three or more hydroxyl groups. For example, by reacting a propenyl ester with an aldehyde and oxygen, a glyceryl tri-ester is formed which may be saponified to produce glycerine. Other uses for the esters formed by a practice of the present invention will suggest themselves to those skilled in the art.

The following examples illustrate the manner in which the present invention finds embodiment.

Example I

It was desired to prepare 2,2,4-trimethyl-pentanediol-3,4 from ethanal, di-isobutene (composed mainly of 2,4,4-trimethyl-pentene-2) and oxygen. To that end, 44 grams of ethanal and 112 grams of di-isobutene were dissolved in 50 grams of ethyl acetate, and 0.5 gram of cobalt acetate catalyst was added to the solution.

By means of a fine glass filter and with simultaneous illumination of the solution by a mercury lamp, a current of dry oxygen gas was passed through the solution until no more oxygen was absorbed, the solution being maintained at a temperature of about —5° C. during this phase of the reaction. The small remaining quantity of unconverted ethanal and the ethyl acetate solvent were then distilled off, leaving a liquid composed mainly of 2,4,4-trimethyl-pentane-diacetate - 2,4. This compound was then saponified by treatment with caustic and there was thus obtained 98 grams of the desired 2,2,4-trimethyl-pentanediol-3,4 having a melting point of 64–65° C. This represented a yield of approximately 67% of the maximum possible theoretical yield.

Example II

In this case it was desired to prepare 2-methyl-pentanediol-2,3 by oxidation of a solution containing ethanal and 2-methyl-pentene-2. Accordingly, 44 grams of ethanal and 84 grams of 2-methyl-pentene-2 were dissolved in 50 grams of ethyl acetate, together with 0.5 gram of cobalt acetate catalyst. A current of dry oxygen was then passed into the solution as the latter was maintained at —5° C. and was subjected to illumination by the rays from a mercury lamp. Oxidation under those conditions was continued until there was no further absorption of oxygen gas. The unreacted ethanal and the ethyl acetate solvent were then distilled off, leaving 2-methyl-pentane-diacetate-2,3. The latter was then saponified by treatment with caustic and yielded 90 grams of the desired product, 2-methyl-pentanediol-2,3 having a melting point of 184° C. This represented a yield of 76% of the maximum theoretical yield.

I claim as my invention:

1. The method of preparing a glycol diacetate, said method comprising forming a solution containing a minor percentage of cobalt acetate catalyst, an olefin and acetaldehyde in the proportion of at least two moles of acetaldehyde for each mole of hydrocarbon, and introducing oxygen gas into said solution until no further absorption of oxygen occurs, said introduction of oxygen being effected while maintaining the solution at a temperature between —20° C. and 10° C., and while illuminating said solution with chemically active light rays.

2. The method of preparing a glycol ester, said method comprising forming a solution containing a saturated aliphatic aldehyde, an unsaturated hydrocarbon having at least one olefinic linkage, and a minor percentage of cobalt acetate catalyst, and introducing oxygen gas into said solution while maintaining the latter at a temperature of between —80° C. and 60° C. until no further absorption of oxygen occurs.

3. The method of preparing a glycol ester, said method comprising forming a solution containing a saturated aliphatic aldehyde, an unsaturated hydrocarbon having at least one olefinic linkage, and a minor percentage of at least one reaction initiator selected from the group consisting of eosine, chlorophyll, hemin, and hematoporphyrine, and introducing oxygen gas into said solution while maintaining the latter at a temperature of between —80° C. and 60° C. until no further absorption of oxygen occurs.

4. The method of preparing a glycol ester, said method comprising forming a solution of an olefine and an aldehyde, and passing oxygen gas into said solution while maintaining the latter at a temperature between —80° C. and 60° C. and while subjecting the solution to the action of chemically active light rays.

5. The method of preparing a glycol ester, said method comprising forming a solution containing a saturated aliphatic aldehyde and an unsaturated hydrocarbon having at least one olefinic linkage, and introducing oxygen gas into said solution while maintaining the latter at a temperature of between —80° C. and 60° C. until no further absorption of oxygen occurs, the reaction being conducted in the presence of at least one reaction initiator.

6. A method of forming a glycol ester, said method comprising passing oxygen gas into a liquid solution containing an aromatic aldehyde and an unsaturated hydrocarbon having at least one olefinic linkage, said solution being maintained at a temperature between —80° C. and 60° C., and the reaction being conducted in the presence of at least one reaction initiator.

7. The method of forming a glycol ester comprising reacting an unsaturated compound containing an olefinic linkage, and which is free of a hydroxyl group, with an aldehyde and with oxygen in the presence of a minor percentage of cobalt acetate and while exposing the reactants to chemically active light rays, said reaction being conducted at a temperature between —80° C. and 60° C.

8. The method of forming a glycol ester, said method comprising reacting an olefin with an aromatic aldehyde and with oxygen in the presence of a minor percentage of an oxidation catalyst, said reaction being conducted at a temperature of between −80° C. and 60° C.

9. The method of forming a glycol ester, said method comprising reacting an olefin with a saturated aliphatic aldehyde and with oxygen in the presence of a minor percentage of an oxidation catalyst, said reaction being conducted at a temperature of between −80° C. and 60° C.

10. The method of forming a glycol ester, said method comprising reacting an unsaturated compound having an olefinic linkage, and which is free of a hydroxyl group, with an aldehyde and oxygen, said reaction being conducted at a temperature between −80° C. and 60° C. and in the presence of at least one reaction initiator.

JOHANNES THOMAS HACKMANN.

REFERENCES CITED

The following references are of record in the file of this patent:

UNITED STATES PATENTS

| Number | Name | Date |
| --- | --- | --- |
| 2,071,395 | Dreyfus | Feb. 23, 1937 |
| 2,138,917 | Grun | Dec. 6, 1938 |
| 2,198,946 | Moskovits | Apr. 30, 1940 |
| 2,341,288 | Pruckner | Feb. 8, 1944 |
| 2,368,494 | Rosen et al. | Jan. 30, 1945 |
| 2,443,409 | Whitner | June 15, 1948 |
| 2,449,001 | Mikeska et al. | Sept. 7, 1948 |